United States Patent Office 3,360,385
Patented Dec. 26, 1967

3,360,385
METHOD OF MAKING FROZEN DINNER CRANBERRY COMPONENT
Stanley I. Skelskie, Brockton, Mass., assignor to Ocean Spray Cranberries, Inc., Hanson, Mass., a corporation of Delaware
No Drawing. Filed Sept. 9, 1964, Ser. No. 395,323
5 Claims. (Cl. 99—193)

ABSTRACT OF THE DISCLOSURE

A method for maintaining cranberry sauce in a gelled state upon thawing of a frozen TV dinner, comprising adding an acid tolerant, quick acting freeze surviving vegetable gelling agent such as hot hydrated starch to cooked cranberries, adding a sugar syrup, cooking the mix to form a sauce, placing an individual serving of the cooked sauce in the TV dinner package and subjecting the contents to a freezing environment to freeze said sauce.

---

This invention relates to frozen food products and more particularly to so called "TV dinners" comprising composite packages containing a variety of foods, for example, meat, poultry, vegetables, relish or sauce, constituting a complete dinner, wherein it is desired to include a processed cranberry sauce, as in a turkey dinner.

Cranberry sauce is now so widely recognized as an almost indispensable accompaniment of any turkey dinner, that it is sorely missed when omitted from frozen turkey TV dinners. Yet, such cranberry sauces are not often, if ever, included in frozen dinners, primarily because of difficulties encountered by reason of their peculiar processing characteristics.

The form of cranberry sauce familiar to the consumer, either as a fresh home-prepared, or as a canned or jarred industrially processed sauce, has considerable body resulting from gelling caused by the natural pectin contained in the raw cranberries, when the cranberries are cooked in a sugar syrup and then cooled. Gelling caused by the natural pectin content of cranberries is, however, a relatively slow process taking eight or more hours to reach equilibrium. If the mix is subjected to a freezing environment before completion of this gelling cycle, the gelling process tends to be disrupted. Attempts by large scale processors, therefore, to add ungelled cranberry sauce to individual TV dinner packages just prior to freezing results, on thawing, in an ungelled flowing liquid so unfamiliar as to be unacceptable to the consumer, particularly because it flows into and colors the other components of the dinner.

As a second approach, if the processor allows the gel period to elapse before he distributes the sauce in individual servings onto individual packages, any mechanical handling of the gelled sauce, as by pumping it through pipes of automatic feed systems, mechanically breaks the gel and secures little better result.

The only alternative has thus been to carefully hand transfer jellied cranberry after an eight-hour gelling cycle to the TV plates before freezing—a labor which is too slow to be compatible with the automated high speed of the rest of the production line. Additionally, such a procedure, including as it does a long storage period, has the intolerable disadvantage of requiring large storage facilities tying up space and equipment.

It is hence an object of this invention to provide a processed cranberry sauce which can be mechanically metered from a source of supply at a high rate of speed into individual TV packages and frozen as a component part of the package dinner, and yet, when the dinner is thawed, has the jellied structure of familiar unfrozen cranberry sauce.

It is a further object of the invention to provide a processed cranberry sauce which can be prepared and delivered to individual TV dinner packages without requiring a long, and preferably without requiring any, pre-gelling cycle, permitting in-line preparation followed by immediate freezing, yet which will provide, when thawed, a cranberry sauce having the same body and jellied appearance as familiar unfrozen cranberry sauce.

The present invention provides a quick-gelling cooked cranberry sauce which does not require the normal eight-hour gelling period, and which may be mechanically handled in a pregelled state and will thereafter gel despite immediate subjection to commercial freezing environment and remain gelled upon thawing. Such cooked cranberry sauce mix thus need not be held for any gelling period after cooking but may be rapidly metered hot directly from the cooking kettles onto individual TV dinner plates in the freeze-line of production without danger of losing gelation before or during the freezing operation or during thawing. Alternatively, sauces of this invention can be rapidly mechanically handled even after gelling without breaking the gel, provided appropriate delicate pumping mechanisms are utilized. Accordingly, unlike previous gelled cranberry sauces, those of this invention may be metered cold into the TV package without losing proper gel structure which survives the freezing operation.

Such sauces comprise cooked whole or strained cranberry sauce mixes prepared in accordance with conventional practice except for the addition to the mix before cooking of a small proportion of a gelling agent in the form of an acid- and freezing-tolerant gelling material. The preferred gelling material is one prepared from waxy maize starch, available on the market as a hot-soluble corn starch whose gelling capacity is not adversely affected by the acid content of cranberries which, in the sauce mix, can cause a pH of 2.5 or lower, nor by freezing temperatures running down to −40° F.

Addition of such starch in an amount of between 1 to 2% by weight of the mix, whether a whole cranberry or a strained cranberry sauce, has been found effective in causing the mix to gel almost instantly as it cools either before or during the freezing operation and, in either case, to survive commercial quick-freeze processes, resulting, upon thawing, in an attractive fully gelled cranberry sauce serving which does not liquefy or flow into the other ingredients of the TV dinner. Other equivalent gelling agents may be used, including other vegetable starches, algins, vegetable gums, carboxy methyl cellulose, alone or in combination, so long as they are acid tolerant and are not adversely affected by the freezing temperatures.

The following is a typical formulation:

Cranberries—500 pounds
Gelling agent (waxy maize starch)—30 pounds
Sugar syrup (79° Brix)—60 gallons
Water—30 gallons The cranberries were placed in about 25 gallons of water and cooked until they reached 185° to 190° F. The cooked material was then screened to remove the skins and seeds. The starch was mixed into the remaining 5 gallons of water, brought up to 190° F., held for about 3 minutes to hydrate the starch and then was added hot to the cooked cranberry mix. The sixty gallons of sugar syrup were then added and the combination cooked until it reached a water soluble solids content of approximately 43–44° Brix. The product was then fed hot to appropriate TV containers and were frozen. As an alternative, the 43–44° Brix was allowed to gel and then individual servings of the cooled gelled sauce were mechanically metered, with a delicate pump, into successive containers, with the containers and contents then being frozen. In both cases, upon thawing, the cranberry sauces remained gelled and did not exude liquid, which would contaminate the other ingredients of the TV dinners.

What is claimed is:

1. In the preparation of a frozen TV dinner package containing a cranberry sauce serving, a method for maintaining the cranberry sauce in a gelled state upon thawing the frozen package, comprising adding an acid tolerant, quick-acting, freeze-surviving vegetable gelling agent to cooked cranberries, adding a sugar syrup, cooking the mix to form a sauce, placing an individual serving of the cooked sauce in the dinner package before freezing and then subjecting the contents of the package, including the cranberry sauce, to a freezing environment to freeze said sauce.

2. In the preparation of a frozen TV dinner package containing a cranberry sauce serving, a method for maintaining the cranberry sauce in a gelled state upon thawing the frozen package, comprising adding an acid tolerant, quick-acting, freeze-surviving vegetable gelling agent to cooked cranberries, adding a sugar syrup, cooking the mix to form a sauce, placing an individual serving of the cooked sauce, while it is hot, in the dinner package before freezing and before the mix has gelled and then subjecting the contents of the package, including the hot cooked cranberry sauce, to a freezing environment progressively to cool, gel, and freeze said sauce.

3. In the preparation of a frozen TV dinner package containing a cranberry sauce serving, a method for maintaining the cranberry sauce in a gelled state upon thawing the frozen package, comprising adding an acid tolerant, quick-acting, freeze-surviving hot hydrated starch to cooked cranberries, adding a sugar syrup, cooking the mix to form a sauce, placing an individual serving of the cooked sauce in the dinner package before freezing and then subjecting the contents of the package, including the hot cooked cranberry sauce, to a freezing environment to freeze said sauce.

4. The method as claimed in claim 12, wherein the gelling agent is added to the mix in an amount by weight between 1 and 2%.

5. In the preparation of a frozen TV dinner package containing a cranberry sauce serving, a method for maintaining the cranberry sauce in a gelled state upon thawing the frozen package, comprising adding an acid tolerant, quick-acting, freeze-surviving hot hydrated starch to cooked cranberries, adding a sugar syrup, cooking the mix to form a sauce, placing an individual serving of the cooked sauce, while it is hot, in the dinner package before freezing and before the mix has gelled, and then subjecting the contents of the package, including the hot cooked cranberry sauce, to a freezing environment progressively to cool, gel, and freeze said sauce.

References Cited

UNITED STATES PATENTS 2,563,996   8/1951   Edgar et al. _____ 99—139

A. LOUIS MONACELL, *Primary Examiner.*

J. M. HUNTER, *Assistant Examiner.*

UNITED STATES PATENT OFFICE
CERTIFICATE OF CORRECTION

Patent No. 3,360,385
December 26, 1967

Stanley I. Skelskie

It is hereby certified that error appears in the above numbered patent requiring correction and that the said Letters Patent should read as corrected below.

Column 4, line 9, for the claim reference numeral "12" read -- 3 --.

Signed and sealed this 28th day of January 1969.

(SEAL)
Attest:

Edward M. Fletcher, Jr.
Attesting Officer

EDWARD J. BRENNER
Commissioner of Patents